US005622005A

United States Patent [19]

Ochenski et al.

[11] Patent Number: 5,622,005
[45] Date of Patent: Apr. 22, 1997

[54] AUTOMOTIVE DOOR GLASS ASSEMBLY

[75] Inventors: James E. Ochenski, Warren; David M. Mooney, Rochester Hills, both of Mich.

[73] Assignee: General Motors Corporation, Detroit, Mich.

[21] Appl. No.: 554,056

[22] Filed: Nov. 6, 1995

[51] Int. Cl.$^6$ .................................................. E05F 11/38
[52] U.S. Cl. .................................................. 49/375; 49/502
[58] Field of Search ............................... 49/375, 374, 502

[56] References Cited

U.S. PATENT DOCUMENTS

| | | | |
|---|---|---|---|
| 4,747,232 | 5/1988 | Stephenson et al. | 49/452 |
| 4,827,671 | 5/1989 | Herringshaw et al. | 49/503 |
| 4,910,917 | 3/1990 | Brauer | 49/375 X |
| 4,956,942 | 9/1990 | Lisak et al. | 49/502 |
| 4,984,389 | 1/1991 | Benoit et al. | 49/502 |
| 5,076,638 | 12/1991 | Andexlinger et al. | 296/201 |
| 5,113,620 | 5/1992 | Guillaume et al. | 49/375 |
| 5,502,926 | 4/1996 | Grace et al. | 49/375 |

Primary Examiner—Philip C. Kannan
Attorney, Agent, or Firm—Ernest E. Helms

[57] ABSTRACT

An automotive door glass assembly which in a preferred embodiment includes an extendable door glass extendable from a door cavity and having a first bore and an edge surface; a shoe supporting the door glass having an alignment surface and a generally oblong longitudinal slot intersecting the first bore; a U-shaped cradle positioned adjacent the glass around the edge of the glass having a bore generally aligned with the first bore, the cradle also having a ledge and a surface in contact with the shoe alignment surface; a cam plate fitted within the first bore and the bore of the cradle, the cam plate having a head retained by the ledge of the cradle; a fastener eccentrically mounted in the cam plate and engaged therewith for permanently affixing the position of the glass with respect to the shoe; and a sleeve surrounding the threaded fastener and torsionally associated with the cam plate at a first end and at a second end having a torque receiving head to allow for adjustment of the glass with respect to the shoe.

7 Claims, 3 Drawing Sheets

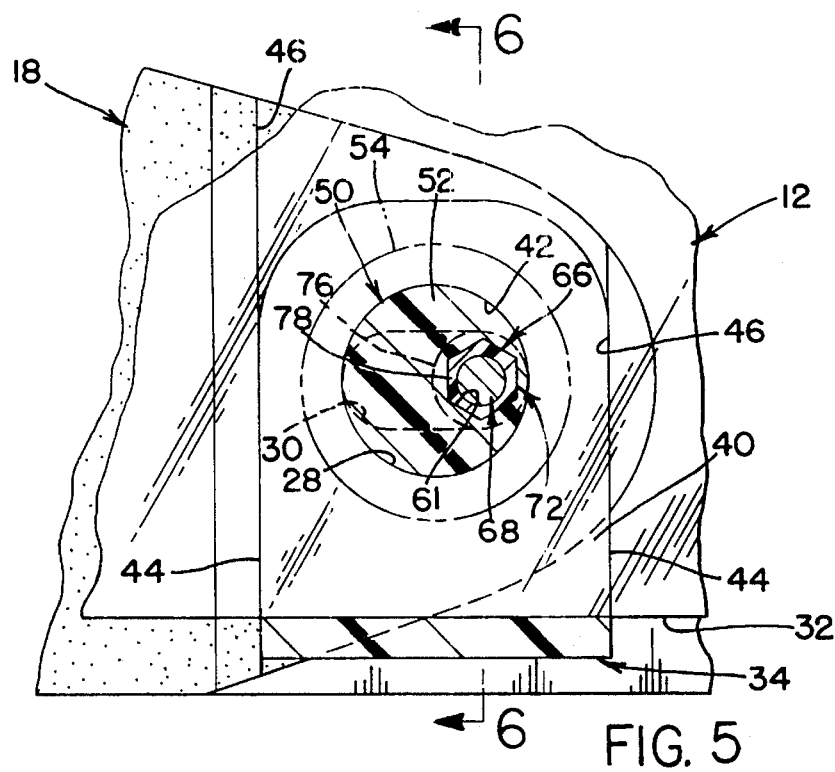
FIG. 5
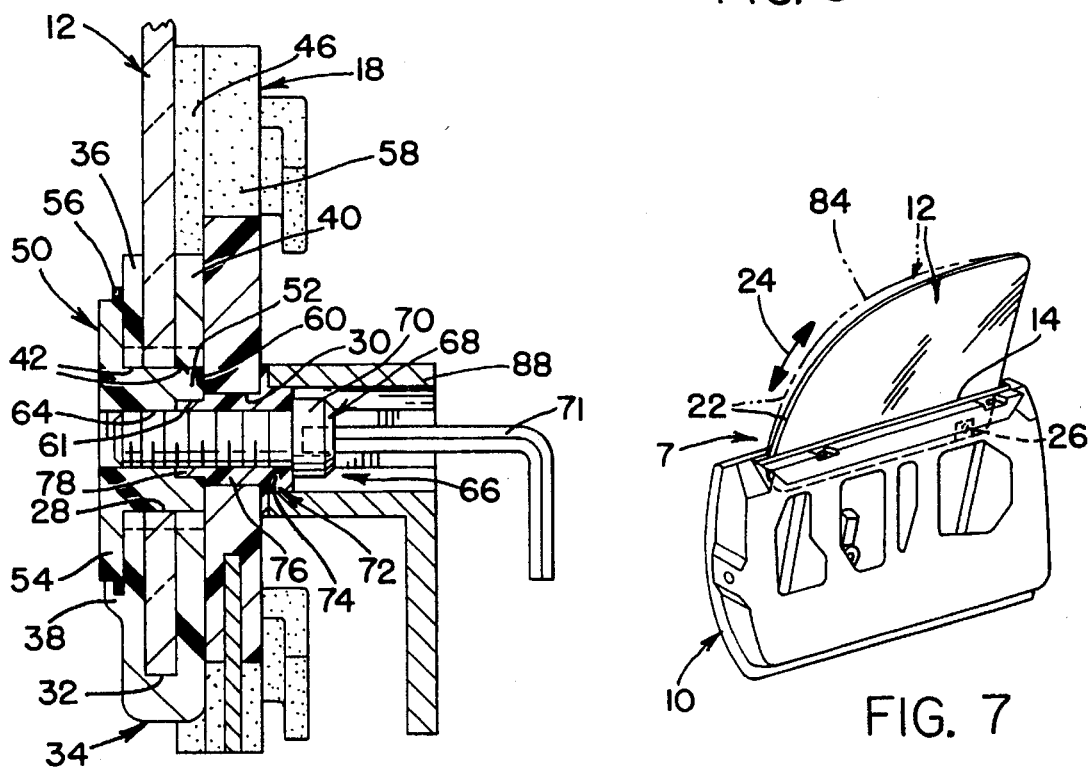
FIG. 6
FIG. 7

AUTOMOTIVE DOOR GLASS ASSEMBLY

FIELD OF THE INVENTION

The field of the present invention is that of adjustable automotive door glass assemblies.

BACKGROUND OF THE INVENTION

Presently, almost all automotive vehicles manufactured have extendable windows. Many vehicles also do not support the window glass above the belt line of the vehicle. Therefore, the window glass must seal with the car body. To ensure proper mating of the window glass with the car body while compensating for build tolerances, most vehicle bodies have some mode of adjustment of the auto glass with respect to the vehicle door. Lisak et al, U.S. Pat. No. 4,956,942, presents an automotive window adjustment mechanism for adjusting the window glass in an inboard and outboard direction.

SUMMARY OF THE INVENTION

The present invention brings forth the revelation of an adjustable automotive vehicle door glass assembly which is most suitable for adjustment of the vehicle glass in a vertical plane. The present invention is particularly useful in ensuring proper mating of the window glass with the weather stripping placed on the A pillar (front door) of the vehicle. In addition, in its preferred embodiment, the present invention provides a cam-actuating adjustment system which may be readily adjusted in position by an automotive assembler with greater ergonomic ease.

BRIEF DESCRIPTION OF THE DRAWINGS

FIG. 5 is a view similar to that of FIG. 3 with the position of the door glass being adjusted from the position shown in FIG. 3.

FIG. 6 is a view taken along line 6—6 of FIG. 5.

FIG. 7 is a perspective view illustrating the range of adjustment provided by the door glass assembly according to the present invention.

DESCRIPTION OF THE PREFERRED EMBODIMENT

Figure 1:
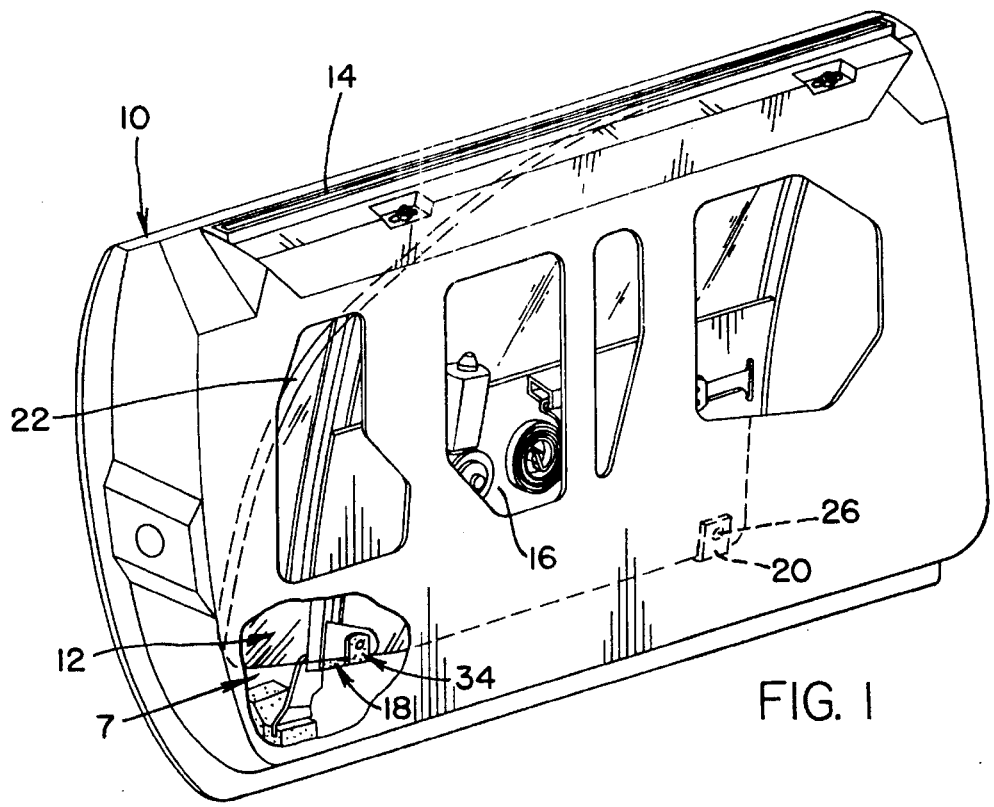
FIG. 1 is a perspective view of an automotive door glass assembly according to the present invention placed in an environment of a cavity of an automotive vehicle front door.
Figure 2:
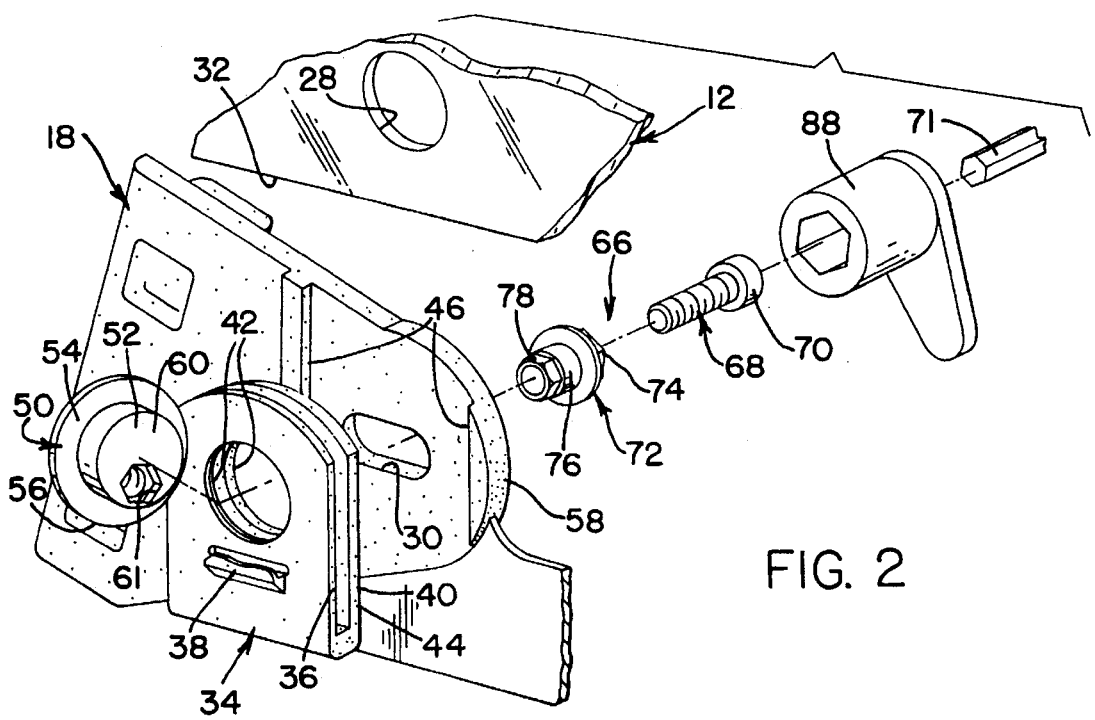
FIG. 2 is an exploded view illustrating in greater detail the components of the automotive door glass assembly of the present invention shown in FIG. 1.

Referring to FIGS. 1–7 and in particular to FIG. 1, an automotive door glass assembly 7 is shown in its lower or retracted position inside the interior cavity of a front hardtop vehicle door 10 which, as can be seen, does not support a glass pane 12 above the belt line 14. A window regulator mechanism 16 similar to that shown and described in greater detail in commonly assigned U.S. Pat. No. 5,430,976 to Wirsing is provided for moving the glass pane 12 up and down. The glass pane 12 is supported on the window regulator by virtue of a forward shoe 18 and a rearward shoe 20. The glass pane 12 has a forward curvilinear edge 22 which mates with an A pillar (not shown) of the vehicle. Typically, to ensure proper sealing with the weather strip placed on the A pillar, one of the greater challenges is to adjust the window pane 12 in a vertical plane corresponding to the direction shown by arrow 24. During this adjustment, the window pane 12 is allowed a fixed axis vertical plane pivotal movement with respect to the shoe 20 via an attachment pin 26.

Referring to FIGS. 2–6, the window pane 12 has a first bore 28 along an area adjacent to the forward shoe 18. The forward shoe 18 has an elongated oblong, generally linear horizontal slot 30 which is positioned to intersect with the first bore 28. As mentioned previously, the shoe 18 is fixably connected to the regulator mechanism 16.

Positioned adjacent the glass pane 12 and contacting a lower edge 32 thereof is a cradle 34. The cradle 34 is generally U-shaped and has a closed portion adjacent the edge 32 of the glass pane 12 and also has a ledge 38 on the inboard leg 36. The inboard leg 36 and outboard leg 40 both have a bore 42 generally aligned with the first bore 28 of the window glass. The cradle outboard leg 40 has on opposed ends a surface 44 which is retained by the alignment surfaces 46 provided on the shoe 18.

Inserted within the bores 42 of the cradle and first bore 28 of the glass pane is a cam plate 50. The cam plate 50 has a main body 52 joined to a head 54. Head 54 has an annular rim 56 which becomes entrapped behind the ledge 38 to prevent the cam plate 50 from falling out of position during the assembly operation, thereby allowing adjustment and final attachment of the glass pane 12 to the shoe 18 to be completed in a blind fashion, that is, totally from the outboard side 58 of the shoe 18. Cam plate 50 has on its side 60 a hexagonal indention 61 which intersects an eccentric threaded bore 64.

To adjust the position of the glass pane 12 with respect to the shoe 18 and to affix the position thereof, there is provided a two-part turn shaft 66. Turn shaft 66 has a threaded fastener 68 with a head 70 which can receive an Allen wrench 71. The threaded fastener 68 is encircled by a sleeve 72 having a hexagonal torque receiving head 74. The sleeve 72 also has a circular portion 76 received within slot 30 capped off by a hexagonal portion 78 which fits within the hexagonal indention 61 of the cam plate.

Figure 3:
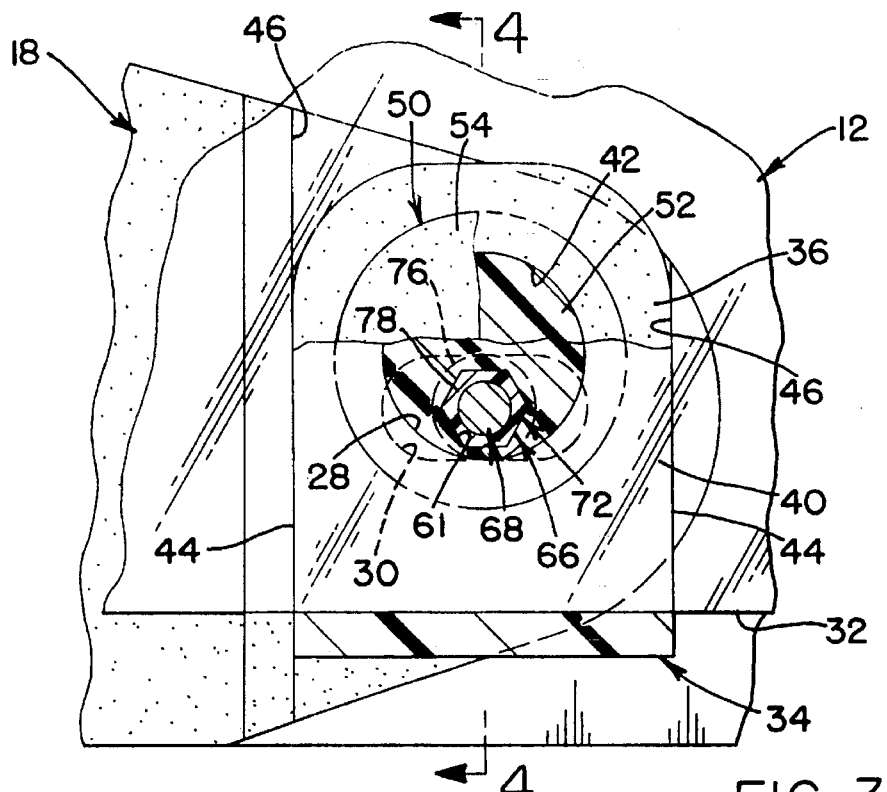
FIG. 3 is an assembled front elevational view partially sectioned illustrating the components of the automotive door glass assembly shown in FIG. 2.
Figure 4:
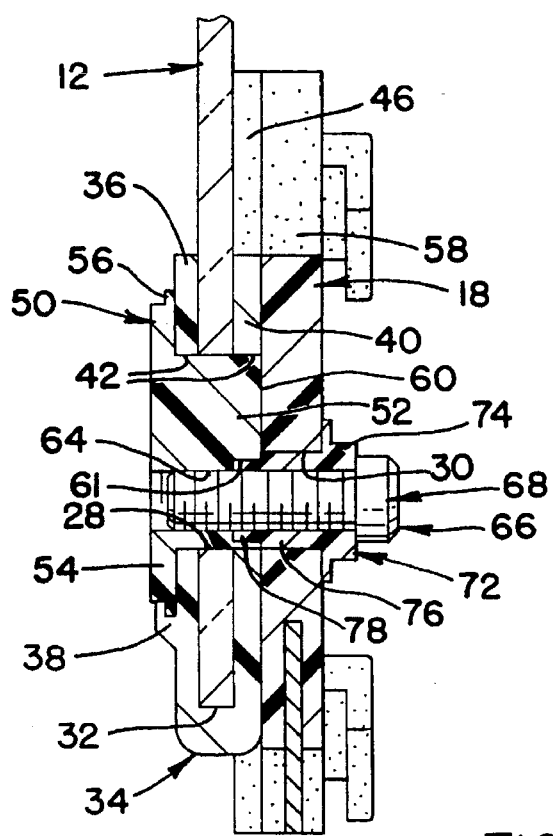
FIG. 4 is a view taken along line 4—4 of FIG. 3.

To move the glass pane 12 from the position shown in solid line in FIG. 7 to the position shown in phantom along line 84, the door glass assembly 7 must be moved from the position shown in FIGS. 5 and 6 to the position shown in FIGS. 3 and 4. To achieve the above, an open wrench 88 is grabbed by the operator to engage with the head 74 of the sleeve 72. Since the sleeve 72 is torsionally associated with the cam plate 50, rotation of the sleeve 72 will cause corresponding rotation of the cam plate 50 and will cause the glass pane 12 to assume the raised position shown along phantom line 84 and in FIGS. 3 and 4. When the above-noted position is achieved, an assembler may therefore elect to permanently affix the glass pane 12 with the shoe 18 and lock the relative positions thereof by rotation of the Allen wrench 71. The aforementioned action causes the cam plate 50 to be pulled tightly against the shoe 18, preventing any further rotation of the cam plate 50 and therefore locking the position of the glass pane 12. Care should be taken that the overall length of section 76 of the sleeve 72 should not be so great as to prevent the cam plate 50 from firmly locking against the shoe 18. However, if the shoe 18 is made of a less sturdy material (plastic), the dimensional length of section 76 of the sleeve may be used to ensure against overstraining of the shoe 18.

Should the glass pane 12 need to be replaced in the future, adjustment of the new glass pane 12 may be easily achieved by the loosening of the fastener 68.

An advantage of the present invention is that the first bore 28 may have a snug fit with the cam plate 50 in all adjusted positions. Therefore, relative travel between a glass pane 12 and another hard or sharp object is eliminated in any position of adjustment.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An automotive door glass assembly comprising:
   a door glass having a first bore;
   a shoe supporting the door glass, the shoe having an elongated slot intersecting the first bore of the door glass;
   a cam plate fitted within the bore of the glass; and
   a turn shaft torsionally connected to the cam plate and eccentrically positioned therein, extending through the slot of the shoe wherein rotation of the turn shaft adjusts the position of the door glass with respect to the shoe and wherein the turn shaft includes two members, the first member being an outer sleeve torsionally locked with the cam plate, and the second member being an inner fastener connected to the cam plate for permanently affixing the position of the glass with respect to the shoe.

2. An automotive door glass assembly as described in claim 1 wherein the fastener is threaded with the cam plate and may selectively permanently affix the position of the glass with respect to the shoe.

3. An automotive door glass assembly as described in claim 1 wherein the outer sleeve has a wrench head to allow for adjustment of the glass with respect to the shoe.

4. An automotive door glass assembly as described in claim 1 further including a cradle, the cradle being U-shaped and a closed portion adjacent an edge of the door glass, the cradle having a bore generally aligned with the first bore of the glass.

5. An automotive door glass assembly as described in claim 1 wherein the cam plate has a head which is retained by the cradle.

6. An automotive door glass assembly comprising:
   an extendable door glass extendable from a door cavity, the door glass having a first bore and an edge surface;
   a shoe supporting the door glass having an alignment surface and the shoe having a generally oblong longitudinal slot intersecting the first bore;
   a U-shaped cradle positioned adjacent the glass around the edge of the glass, the cradle having a bore generally aligned with the first bore, the cradle also having a ledge adjacent the bore of the cradle and the cradle having a surface in contact with the shoe alignment surface;
   a cam plate fitted within the first bore and the bore of the cradle, the cam plate having a head retained by the ledge of the cradle;
   a fastener eccentrically mounted in the cam plate and engaged therewith for permanently affixing the position of the glass with respect to the shoe; and
   a sleeve surrounding the fastener, the sleeve being torsionally associated with the cam plate at a first end and at a second end having a torque receiving head to allow for adjustment of the glass with respect to the shoe.

7. An automotive door glass assembly as described in claim 6 wherein the fastener selectively permanently affixes the position of the glass with respect to the shoe.

* * * * *